United States Patent [19]
Williams

[11] Patent Number: 6,063,295
[45] Date of Patent: May 16, 2000

[54] APPARATUS AND METHOD TO INCREASE OXYGEN LEVELS IN LIVESTOCK DRINKING WATER

[76] Inventor: Russell L. Williams, 123 N. Second, Washington, Iowa 52353

[21] Appl. No.: 09/121,381

[22] Filed: Jul. 23, 1998

[51] Int. Cl.[7] ........................................ C02F 1/00
[52] U.S. Cl. .......................... 210/744; 210/759; 210/120; 210/123; 210/139; 210/134; 210/109; 210/127; 261/115; 261/119.1
[58] Field of Search ...................................... 210/744, 759, 210/123, 134, 139, 741, 109, 120, 127, 128; 261/115, 119.1

[56] References Cited

U.S. PATENT DOCUMENTS

| | | |
|---|---|---|
| 3,617,032 | 11/1971 | Tracy . |
| 3,779,913 | 12/1973 | Martin . |
| 4,096,215 | 6/1978 | Albrecht . |
| 4,101,608 | 7/1978 | Bracey . |
| 5,096,596 | 3/1992 | Hellenbrand et al. . |
| 5,154,835 | 10/1992 | DeMichael . |
| 5,292,431 | 3/1994 | Romagnoli . |
| 5,492,913 | 2/1996 | Wierzbicki . |
| 5,542,608 | 8/1996 | Kaylor . |
| 5,735,934 | 4/1998 | Spears . |
| 5,851,445 | 12/1998 | Kazuma . |

OTHER PUBLICATIONS

Advertising Material— "The Air Charger Retention Tank From Krudico", Krudico, Inc. 308 E. Fourth, Auburn, IA 51433— obtained Oct. 21, 1998.

Advertising Material— "The Air Charger Retention Tank From Krudico", Krudico, Inc. 308 E. Fourth, Auburn, IA 51433.

*Primary Examiner*—David A. Simmons
*Assistant Examiner*—Chester T. Barry
*Attorney, Agent, or Firm*—Allan L. Harms

[57] ABSTRACT

Apparatus to increase the level of oxygen ingested by livestock by oxygenation of the livestock water supply includes an enclosed tank having a top and having an inlet for admitting water from a supply of water and an outlet for discharging water from the tank. The tank has a first inlet port for introduction of compressed air into the tank from an air compressor. The tank has a second inlet port for allowing introduction of hydrogen peroxide. A float is located in the tank to selectively control the introduction of compressed air into the tank by activation of the air compressor when the water level reaches a preselected high point as the water in the tank absorbs oxygen from the air pocket above the water level. The float also opens a valve in an overflow tube disposed within the tank and keeps the valve open until the float reaches a predetermined low point as water is forced out the overflow tube by compressed air entering the tank. When the low point of the float is reached, a timer begins to run for a preselected interval. The timer causes the air compressor to continue to force compressed air into the tank and the valve in the overflow tube remains open while the air compressor is operating.

18 Claims, 3 Drawing Sheets

APPARATUS AND METHOD TO INCREASE OXYGEN LEVELS IN LIVESTOCK DRINKING WATER

BACKGROUND OF THE INVENTION

The present invention relates to an apparatus and process to increase the level of oxygen ingested by livestock.

The need for high quality water in livestock production is becoming increasingly essential. This is primarily due to the overall reduction in water quality and the trend towards larger and denser livestock populations. Water quality, whether it be ground or surface water, has been deteriorating over the last twenty years for reasons that range from livestock waste and agricultural chemical runoff to lowered groundwater tables. Occurrences of contamination from nitrates, bacteria, chemicals, iron, hydrogen sulfide, etc. have become more and more prevalent.

Higher livestock densities have tended to increase outbreaks of stress-related diseases, which, due to crowded conditions, are carried much more rapidly throughout a herd. It has become much more important to control the quality of the environment, the feed and also the water. The effects of poor quality water on livestock growth and mortality are only now being realized. Research at many different agricultural universities has found a direct correlation between poor quality water and poor livestock performance.

In most confinement livestock operations, the air quality at floor level is high in ammonia and nitrogen with a corresponding reduction in oxygen. This is due to the problems associated with concentrated animal waste on the floor and in the collection pits under the floor. These conditions tend to cause stress in the animals and can lead to reduced growth performance and higher mortality rates. Attempts at improving the air quality have resulted in better ventilation techniques; however this alone has not alleviated the problem.

Efforts to improve water quality for livestock have been many and varied. Current technology exists to solve virtually any specific water problem; however no one technology exists to solve a variety of problems with a single process. The high water volume demanded by most livestock operations can make the various water treatment processes prohibitively expensive due to the high capital expenditures required for the equipment and the ongoing costs of chemical additives that may be required to operate the equipment. Some of the common water contaminants that tend to cause health-related problems in livestock, as well as aesthetic problems in drinkers, water lines and misters are coliform bacteria, nitrates, sulfates, hydrogen sulfide, iron and manganese.

Aeration equipment has been used to inject and incorporate oxygen into water for a number of years. The primary purpose of the process has been to oxidize organic matter in wastewater and potable water applications. Wastewater aeration is primarily done under atmospheric conditions for the purpose of aerobic digestion. Potable water aeration is used in both atmospheric and pressurized applications. Generally, in atmospheric applications, air is bubble diffused within a tank to accomplish oxidation. It is then repressurized for distribution. A variety of ways are used to provide aeration under pressurized situations. Compressed air, or concentrated oxygen can be injected into a water stream or can be drawn into a water stream with the aid of a venturi. In addition, water can be passed through an air pocket within a tank to accomplish aeration.

Conventional systems are not designed to achieve high dissolved oxygen levels. Their purpose has been primarily to oxidize iron, manganese and hydrogen sulfide. Hyperoxygenation is not required, and in fact, a low oxygen concentration will achieve those results. Therefore, there is no process designed into the system to consistently provide dissolved oxygen levels high enough to ensure supersaturation after the oxidation process has been accomplished.

Hydrogen peroxide has been tested to effectively disinfect water with coliform bacteria at levels of 10 ppm and above. In addition, hydrogen peroxide enables an animal to better fight off invading organisms by migrating within the animal to the invaded area. It will also tend to break down into hydrogen and oxygen to further enhance the blood oxygen level of the animal.

SUMMARY OF THE INVENTION

In the care and nutrition of livestock, particularly swine and poultry, it is desirable to increase the quantity of oxygen which the livestock ingest in order to counteract the concentration of ammonia and nitrogen in the breathing environment in high density livestock confinement facilities. A useful and effective way to increase the amount of oxygen available to livestock is through the drinking water ingested by the livestock. The present invention provides apparatus to increase the quantity of oxygen present in the livestock water supply to a supersaturated level while simultaneously delivering hydrogen peroxide to the livestock in the water they drink.

The present invention discloses apparatus to oxygenate a supply of water which includes an enclosed tank having a top and having an inlet for admitting water from a supply of water and an outlet for discharging water from the tank. The tank has a first inlet port for introduction of compressed air into the tank from an air compressor. The tank has a second inlet port for allowing introduction of hydrogen peroxide. A float is located in the tank to selectively control the introduction of compressed air into the tank by activation of the air compressor when the water level reaches a preselected high point as the water in the tank absorbs oxygen from the air pocket above the water level. The float also opens a valve in an overflow tube disposed within the tank and keeps the valve open until the float reaches a predetermined low point as water is forced out the overflow tube by compressed air entering the tank. When the low point of the float is reached, a timer begins to run for a preselected interval. The timer causes the air compressor to continue to force compressed air into the tank and the valve in the overflow tube remains open while the air compressor is operating.

The present invention utilizes an air pocket to inject oxygen into the water supply, but with profound differences in order to achieve consistently high dissolved oxygen levels. When water is passed through an air pocket it is important to expose as much water as possible to the air in order to dissolve a high proportion of the oxygen into the water.

A means to supply treated water with a high level of dissolved oxygen and hydrogen peroxide can effectively reduce the consequences arising from coliform bacteria, nitrates, sulfates, hydrogen sulfide, iron and manganese. In addition, the overall health of the animal is improved with a corresponding reduction in the incidence of stress-related diseases.

For the oxygen to effectively benefit the animal, the supply lines, and the drinker and mister nozzles, it is important that the oxygen level dissolved in the water be maintained at a minimum of 150% of saturation. In order to achieve this level at atmospheric conditions from an air source, oxygen must be incorporated into the water under pressure. The saturation level under normal well water system pressures will reach 400–600% of saturation. When water is drawn from the pressurized system, much of the oxygen will be released into the atmosphere creating a milky look to the water. Once the bubbles have dissipated, the water must maintain a dissolved oxygen level of at least 150% of saturation to be effective.

A special diffuser is used to divert much of the water throughout the entire air pocket while breaking the water stream into as many small parts as possible. As the oxygen from the air is dissolved into the water, the oxygen concentration in the air pocket is proportionately reduced. This must be restored on a consistent basis in order to achieve consistent dissolved oxygen levels.

The disclosed system utilizes a level control within the tank to achieve consistency of oxygen saturation. As the oxygen is dissolved into the water, the gaseous air pocket is displaced by water, thereby raising the water level within the tank. A level control senses the higher level and turns on the air input compressor and opens a relief solenoid. This pumps additional air into the tank and correspondingly lowers the water level. When the water level has been lowered to the outlet relief tube level, the level control will transfer power to a delayed shut off timer assembly. This assembly allows the compressor to run and the relief solenoid to remain open for an additional five minutes before shutting off. This extra time allows for existing oxygen-depleted air to escape from the tank and to be replaced with oxygen rich air.

This design allows for totally automatic air precharges based solely on the amount of oxygen required. The amount of oxygen required to achieve high saturation levels can vary greatly. Two basic factors determine the oxygen requirements. The first and most important parameter is the characteristics of the water to be treated. Water contaminants such as iron, manganese, hydrogen sulfide and many types of organic matter will require varying amounts of oxygen to achieve oxidation. Another important parameter is the flow rate of the water going through the system. The more water being used, the more oxygen is required. Oxidative contaminants at high levels, along with a consistently high flow rate, can deplete the oxygen within the tank quite rapidly. The level control assembly senses this depletion and will replace the oxygen supply as needed.

Along with hyperoxygenation, this system incorporates hydrogen peroxide (H2O2) into the process. Hydrogen peroxide will effectively disinfect the water while providing distinct health advantages to the animals consuming the treated water. Additionally, the hydrogen peroxide will eliminate iron bacteria from the water, should it exist. Iron bacteria can cause severe fouling of conventional systems. The iron bacteria will grow inside the aeration tank and restrict the flow of water through the system. It can also coat any media being used in a downstream filter, rendering it useless.

Hydrogen peroxide injection has been used for some time by itself and can achieve beneficial results. However, injecting hydrogen peroxide with the hyperoxygenation process substantially reduces the amount of peroxide required to achieve the desired results. In virtually any application, the amount of peroxide used to obtain a desired residual level can be reduced by over 50% when used with the hyperoxygenation process. In applications where the water is high in organic matter, the reduction can be over 75%. This is possible because the oxygen in the aeration tank will serve to oxidize the material. The hydrogen peroxide is then used primarily for disinfection.

A chemical feed pump is used to inject the hydrogen peroxide into the aeration tank. The feed pump is primarily turned on and off by an electrical connection to the water well pump. Alternate means to control the on and off cycles of the feed pump can be used, such as a flow sensor or timer assembly.

When a well pump connection is used, power is supplied to the feed pump only while the well pump is on. A separate adjustment is used to control the feed rate of the hydrogen peroxide in order to control the injection amount. When water is used that is not from a well source, a proportional feed pump can be used. This incorporates a water flow meter which sends pulse signals to the feed pump in direct proportion to the flow of the water. Additionally, a timer assembly can be used when water flow is consistent and injection of hydrogen peroxide can be accomplished at timed intervals.

Benefits of Hyperoxygenation for Livestock

Oxygen is required for virtually all processes within an animal's body. These processes include the metabolic process, the rejuvenation of cells and fighting off of invading pathogens. By increasing the amount of free oxygen (O+) available to the animal, these processes are enhanced. Food is metabolized more thoroughly, thereby improving the feed conversion ratio. Blood oxygen levels are increased which rejuvenates the cells and enables them to more effectively fight off invading pathogens. Because of the slightly effervescent taste of the water, animals tend to drink more. The more water they drink, the more feed they eat and the faster they grow. The end result is a healthier animal that gets to market sooner.

Hydrogen peroxide is naturally produced within an animal as a first line of defense against invading organisms. By adding additional hydrogen peroxide to the animal's water supply, this process is also enhanced. Also the hydrogen peroxide can maintain disinfection throughout the water supply lines. Should animals in one part of the building become sick, the chances of spreading that disease throughout the herd by contamination of the water lines is substantially reduced.

It is accordingly an object of the invention to provide apparatus to oxygenate a stream of water for livestock use which maintains a high level of dissolved oxygen in the water.

It is another object of the invention to provide oxygenation apparatus for a livestock water supply which selectively injects hydrogen peroxide into the water being oxygenated.

It is a further object of the invention to provide oxygenation apparatus which recharges when the air pocket above the water level in the enclosed treatment tank becomes depleted of oxygen.

It is a further object of the invention to provide a method to maintain a high level of dissolved oxygen in a livestock water supply.

DESCRIPTION OF THE DRAWING FIGURES

DETAILED DESCRIPTION OF THE INVENTION

Figure 1:
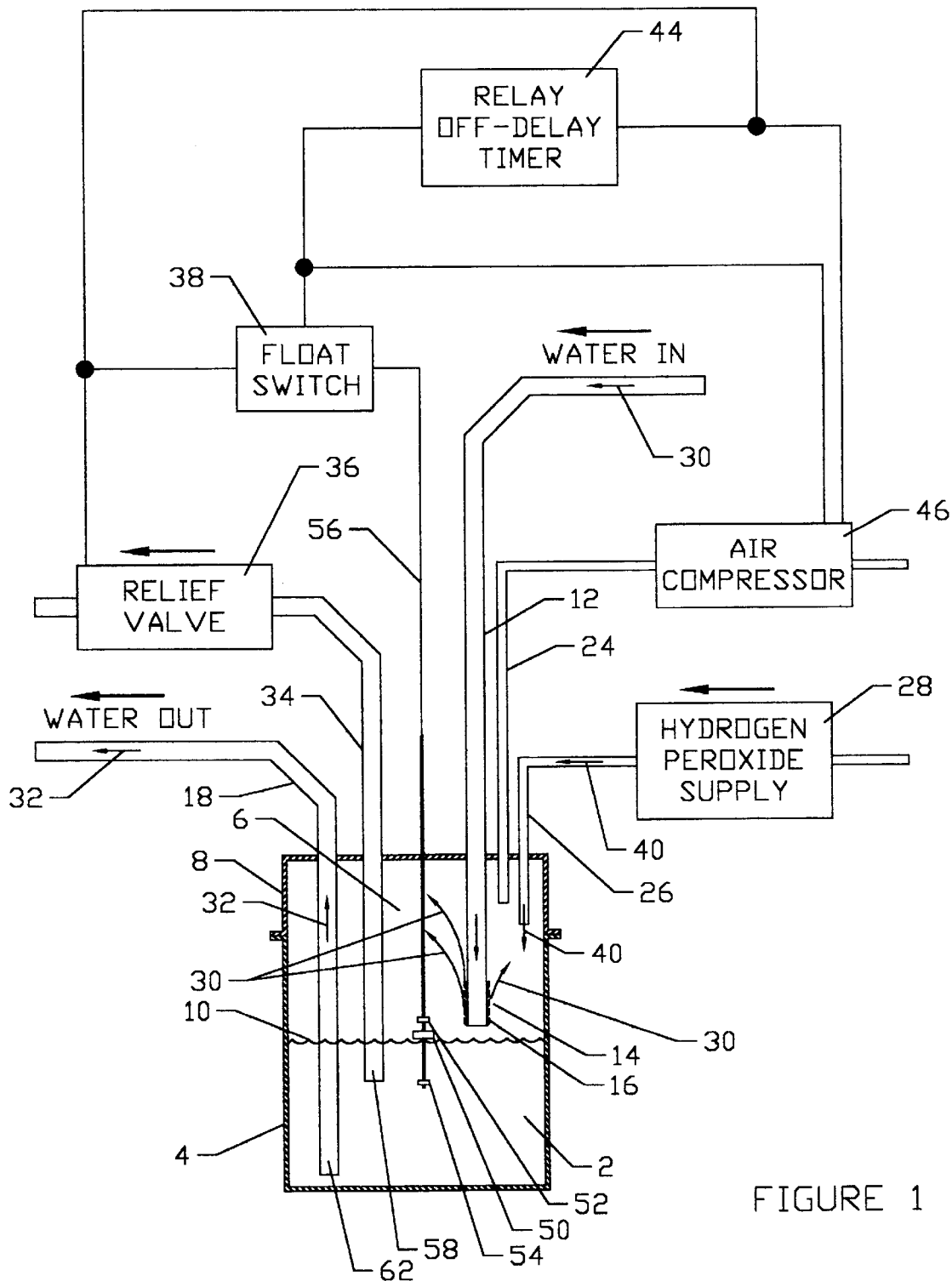
FIG. 1 is a schematic sectional view of the water oxygenation apparatus of the invention in a service mode with arrows 30 showing the flow of raw water and arrows 32 showing the flow of oxygenated water.

Referring to the figures, a water tank 4 is provided with a cover 8 which seals the enclosure. A water inlet duct 12 passes through cover 8 and is provided with a diffuser 14 to cause water entering through water inlet duct 12 to be sprayed upward by upwardly slanted louvers 16 arranged on diffuser 14. Raw water entering tank 4 from a water supply is indicated by arrows 30 and it can be seen that raw water leaving diffuser 14 is directed toward cover 8 and through air pocket 6 over water level 10 within tank 4.

As water is needed to supply drinking livestock, oxygenated water is drawn from tank 4 through water outlet tube 18 which has its intake end 62 near the bottom of tank 4. Arrows 32 indicate the direction of flow of oxygenated water through water outlet tube 18. As oxygenated water is drawn, raw water is allowed to enter through water inlet duct 12.

A hydrogen peroxide inlet tube 26 supplies hydrogen peroxide in the direction of arrows 40 through cover 8 from hydrogen peroxide supply 28 to be injected into water 2 in tank 4. An air compressor 46 is coupled by compressed air duct 24 to tank 4 such that oxygen-rich compressed air may be selectively introduced into air pocket 6 above water level 10.

A relief tube 34 is disposed tank 4 with its intake 58 at substantially the same elevation as lower limit 54 of float 50.

Float 50 is allowed movement atop water level 10 between lower limit 54 and upper limit 52. When float reaches upper limit 52, a signal is produced along signal line 56 which couples float upper limit 52 to float switch 38. Float switch 38 is electrically coupled to relief valve 36 which opens relief tube 34 to allow water 2 from tank 4 to pass therethrough. Float switch 38 is also coupled to air compressor 46 and to relay off-delay timer 44.

FIG. 1 illustrates the invention in its ambient state of operation with float 50 disposed between lower limit 54 and upper limit 52. As water enters tank 4 in the direction of arrows 30 through water inlet duct 12, it is sprayed through air pocket 6 and absorbs oxygen therefrom. As air pocket 6 becomes depleted of oxygen from the absorption of oxygen by water being sprayed by diffuser 14, air pocket 6 contracts and water level 10 rises.

Figure 2:
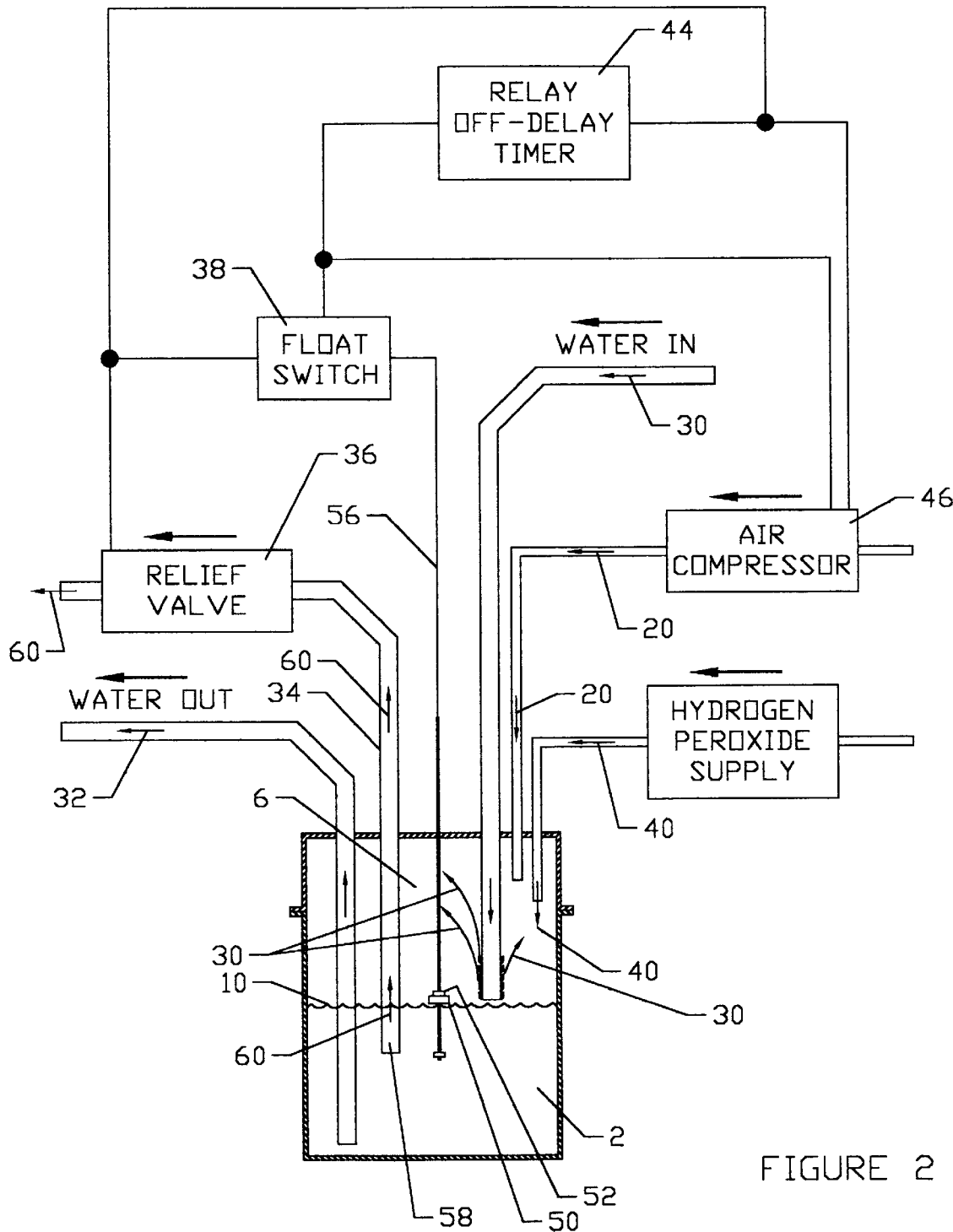
FIG. 2 is a schematic sectional view of the invention in the air pocket recharge mode showing the flow of compressed air by arrows 20 and the flow of overflow water by arrows 32.

As water level 10 rises because of the contraction of air pocket 6, float 50 approaches upper limit 52. FIG. 2 discloses the state of operation when float 50 rises to upper limit 52. The engagement of float 50 upon upper limit 52 causes a signal to pass float signal line 56 to float switch 38 which causes air compressor 46 to actuate and to begin pumping compressed air into tank 4 along compressed air duct 24. Simultaneously float switch 38 causes relief valve 36 to open to allow water 2 to be exhausted from tank 4 through relief tube 34 as compressed air enters air pocket 6 and forces water level 10 downward. Water exhausting through relief tube 34 is shown moving in the direction of arrows 60. Compressed air continues to regenerate air pocket 6 with oxygen as water is urged through relief tube 34.

Figure 3:
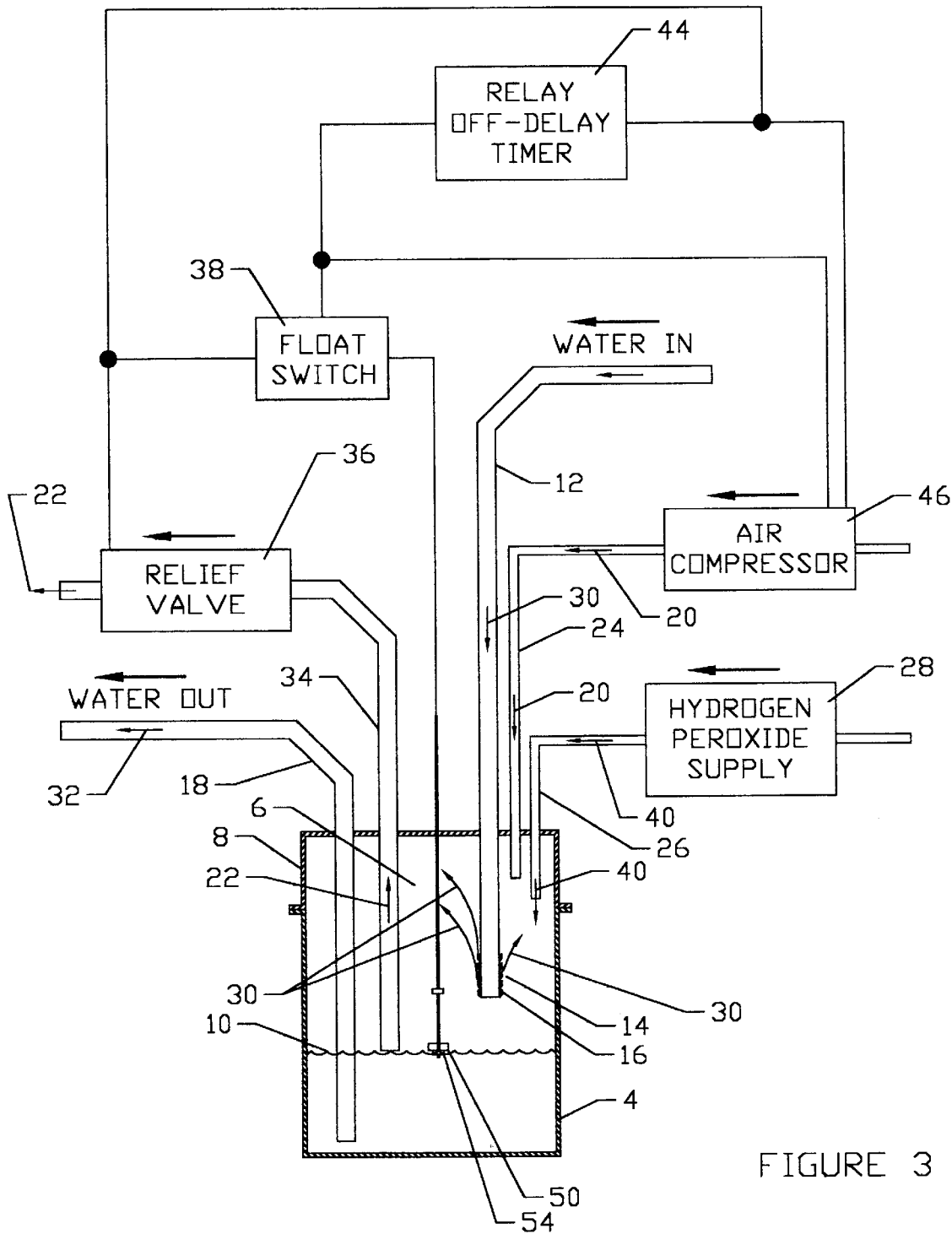
FIG. 3 is a schematic sectional view of the invention in the timed recharge mode showing the water level in the tank at a lower level with the flow of compressed air shown by arrows 20 and the flow of oxygen depleted air by arrows 22.

When float 50 descends along with water level 10 to a point where float 50 touches lower limit 54, a third state of operation begins, as depicted in FIG. 3. The engagement of float 50 on lower limit 54 signals float switch 38 to trigger timer 44 to commence a timed countdown of about five minutes during which timer causes air compressor 46 to remain operating, continuing to deliver compressed air in the direction of arrows 20 through compressed air tube 24 into air pocket 6 within tank 4. But for the commencement of the timed countdown of timer 44, air compressor 46 would shut off because float 50 had reached lower limit 54.

Similarly, timer 44 signals relief valve 36 to remain open, thereby allowing oxygen depleted air from air pocket 6 to be exhausted through relief tube 34 in the direction of arrows 22. The timer 44 keeps the air compressor 46 operating and the relief valve 36 open to insure that stale air is expelled and fresh oxygen-rich air is present in air pocket 6 when the fixed countdown of timer 44 is completed. When the predetermined timed interval during which the timer 44 operates to keep air compressor 46 operating and relief valve 36 open is complete, timer 44 stops and it causes relief valve 36 to close relief tube 34 and air compressor 46 to stop.

It is to be understood that hydrogen peroxide is introduced into water 2 in tank 4 at each stage of operation, thereby increasing the concentration of oxygen in the water 2 as well as permitting the supply of a mixture of water and hydrogen peroxide to drinking livestock using water coming through water outlet duct 18.

The injection of hydrogen peroxide may be accomplished by a chemical feed pump activated cooperatively with the water supply pump or by measurement of the quantity of water flowing into tank 4 by flow meter means or by timer means.

Having described the invention, I claim:

1. Apparatus to increase oxygen dissolved in a livestock water supply comprising an enclosed tank with a varying water level therein, the tank having an inlet for admitting water from an external supply of water and an outlet for discharging water from said tank, said tank having a top and having a first inlet port for introduction of compressed oxygen-rich gas into the tank, float means operative within said tank to selectively control the introduction of oxygen-rich gas into said tank, an overflow tube disposed within said tank, said float means operative to selectively control flow of fluids through the overflow tube, timer means to control introduction of said oxygen-rich gas through said first inlet port and to selectively permit flow of fluids through said overflow tube, said float means operative to enable operation of said timer means.

2. The apparatus of claim 1 wherein a supply of hydrogen peroxide is provided, said tank having a second inlet port for introduction of said hydrogen peroxide into said tank.

3. The apparatus of claim 1 wherein said inlet for admitting water is disposed above the water level in said tank, diffuser means is provided upon said inlet for admitting water to direct said water toward said top of said tank.

4. The apparatus of claim 1 wherein said float means is operable to activate introduction of said oxygen-rich gas into said first inlet port when said water level reaches a predetermined relatively high position, said float means operable to activate a timer when said water level is lowered to a relatively low level, said timer activates introduction of said oxygen-rich gas into said first inlet port for a predetermined time.

5. The apparatus of claim 4 wherein said float means is operable to selectively permit flow of fluids through said overflow tube when said float means activates introduction of said oxygen-rich gas into said first inlet, said timer is operable to permit flow of fluids through said overflow tube when said timer activates introduction of said oxygen-rich gas into said first inlet port.

6. The apparatus of claim 1 wherein an air compressor is operatively connected to said first inlet port to provide said oxygen-rich gas, said float means comprises a float disposed within said tank which rises and falls with the water level in said tank, said float means further comprising a fluid valve operatively connected to said overflow tube, said float having an upper limit at which said fluid valve is opened, said float having a lower limit at which said fluid valve is closed.

7. The apparatus of claim 6 wherein said float means activates said air compressor when said float attains said upper limit, said float selectively deactivates said air compressor when said float attains said lower limit, said float selectively activates said timer means when said float reaches its lower limit, said timer means activates said air compressor for a predetermined time.

8. The apparatus of claim 7 wherein said overflow tube has a lower end within said tank, said lower end of said overflow tube disposed at an elevation substantially equal to said lower limit of said float.

9. The apparatus of claim 8 wherein said inlet for admitting water is disposed above the elevation of said upper limit of said float, said inlet for admitting water is provided with diffuser means to spray water entering said tank toward said top of said tank, a supply of hydrogen peroxide is provided, said tank having a second inlet port for introduction of said hydrogen peroxide into said tank.

10. Apparatus to oxygenate a supply of water comprising an enclosed tank having a top and having an inlet for admitting water from a supply of water and an outlet for discharging water from the tank, said tank having a first inlet port for introduction of compressed oxygen-rich gas into the tank near the top of said tank, said tank having a second inlet port for introduction of hydrogen peroxide into said tank, float valve means responsive to the level of water in said tank and operative to selectively control the introduction of oxygen-rich gas into said tank, an overflow tube disposed within said tank, a timer to control timed introduction of said oxygen-rich gas through said first inlet port, control valve means responsive to said float valve means and to said timer to selectively control flow of fluid through the overflow tube.

11. The apparatus of claim 10 wherein said float valve means is operable to activate introduction of said oxygen-rich gas into said first inlet port when said tank is filled with water to a preselected relatively high level, said float valve means operable to activate the timer when said tank is filled with water to a preselected relatively low level, said timer activates introduction of said oxygen-rich gas into said first inlet port for a predetermined time.

12. The apparatus of claim 11 wherein said float valve means is operable to selectively open said control valve means when said tank is filled with water to a relatively high level, said float valve means is operable to selectively close said control valve means when said tank is filled with water to a relatively low level.

13. The apparatus of claim 10 wherein an air compressor is operatively connected to said first inlet port to provide said oxygen-rich gas, said float valve means comprises a float disposed within said tank which rises and falls with the level of water in said tank, said float valve means further comprising a fluid valve operatively connected to said overflow tube, said float having an upper limit at which said fluid valve is caused to open, said float having a lower limit at which said fluid valve is caused to close.

14. The apparatus of claim 13 wherein said float selectively activates said timer means when said float reaches said lower limit, said timer means activating said air compressor for a predetermined time, said timer means causing said fluid valve to open for a predetermined time, said float valve means activating said air compressor when said float attains said upper limit.

15. The apparatus of claim 14 wherein said overflow tube has a lower end within said tank, said lower end of said overflow tube is disposed at an elevation substantially equal to said lower limit of said float.

16. The apparatus of claim 15 wherein said inlet for admitting water is disposed above the elevation of said upper limit of said float, said inlet for admitting water is provided with diffuser means to spray water entering said tank toward said top of said tank.

17. A method for oxygenating a supply of water comprising spraying water into a closed tank having an air pocket therein above a water level therein, injecting compressed oxygen-rich gas into said air pocket of said tank after said water level reaches a relatively high level, continuing to inject compressed oxygen-rich gas into said air pocket for a predetermined time after said water level reaches a predetermined lower level, exhausting fluids from said tank while said compressed oxygen-rich gas is injected into said tank.

18. The method of claim 17 wherein hydrogen peroxide is injected into said tank at predetermined times.

* * * * *